(No Model.) 3 Sheets—Sheet 1.

O. T. BUGG & W. L. LANGLEY.
COTTON HARVESTER.

No. 386,294. Patented July 17, 1888.

Witnesses.
Albert Popking.
Geo. C. Poulton.

Inventors
Owen T. Bugg. W. L. Langley.
By their Attorney
Chas. B. Mann.

(No Model.) 3 Sheets—Sheet 2.

O. T. BUGG & W. L. LANGLEY.
COTTON HARVESTER.

No. 386,294. Patented July 17, 1888.

Witnesses
Albert Popkins.
Geo. C. Poulton.

Inventors.
Owen T. Bugg. W. L. Langley.
By their Attorney
Chas. B. Mann.

(No Model.) 3 Sheets—Sheet 3.
O. T. BUGG & W. L. LANGLEY.
COTTON HARVESTER.
No. 386,294. Patented July 17, 1888.
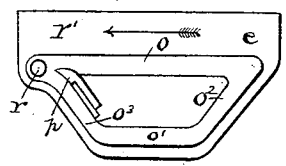
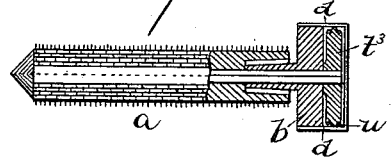
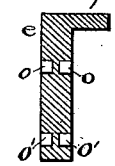
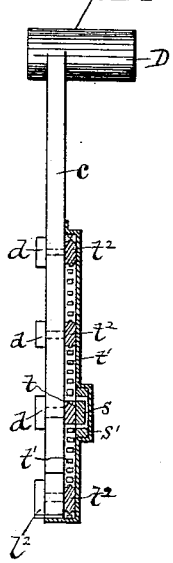
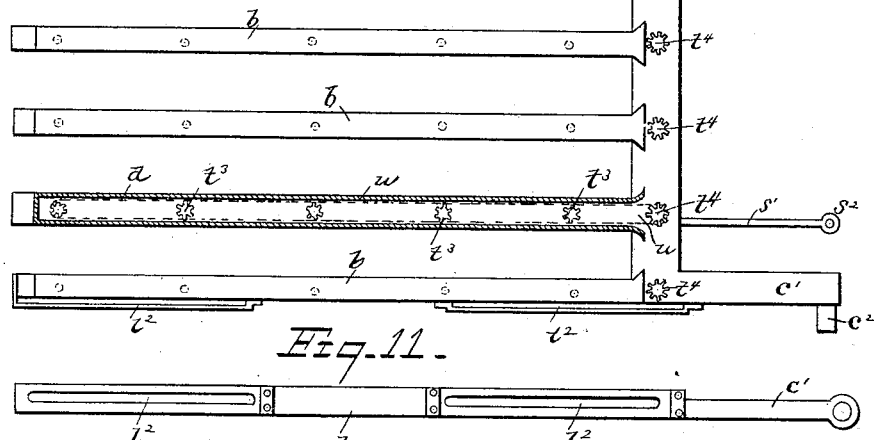
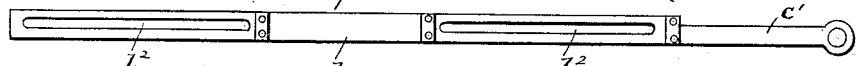
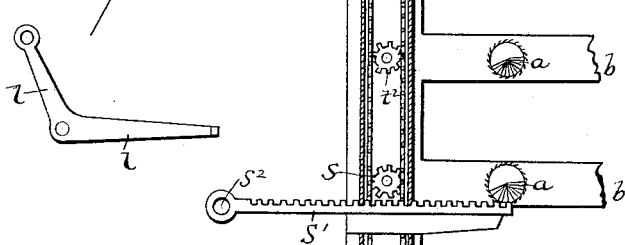
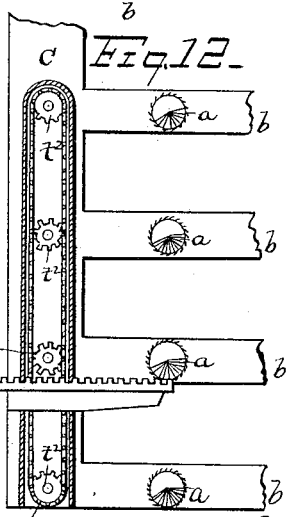
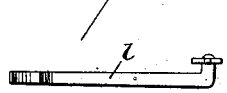
Witnesses.
Albert Popking.
Geo. C. Poulton.
Inventor.
Owen T. Bugg. W. L. Langley.
By their Attorney
Chas. B. Mann.

UNITED STATES PATENT OFFICE.

OWEN T. BUGG AND WILLIAM L. LANGLEY, OF NEWARK, NEW JERSEY; SAID BUGG ASSIGNOR TO THE UNITED STATES COTTON HARVESTER COMPANY, OF NEW YORK.

COTTON-HARVESTER.

SPECIFICATION forming part of Letters Patent No. 386,294, dated July 17, 1888.

Application filed January 14, 1886. Serial No. 188,584. (No model.)

*To all whom it may concern:*

Be it known that we, OWEN T. BUGG and WILLIAM L. LANGLEY, citizens of the United States, both residing in Newark, Essex county, New Jersey, have invented certain new and useful Improvements in Cotton-Harvesters, fully described and represented in the following specification and the accompanying drawings, forming a part of the same.

This invention has relation to improvements in cotton-harvesters; and it consists in the construction and arrangement of parts, as will be hereinafter described, and particularly pointed out in the claims.

Figure 1:
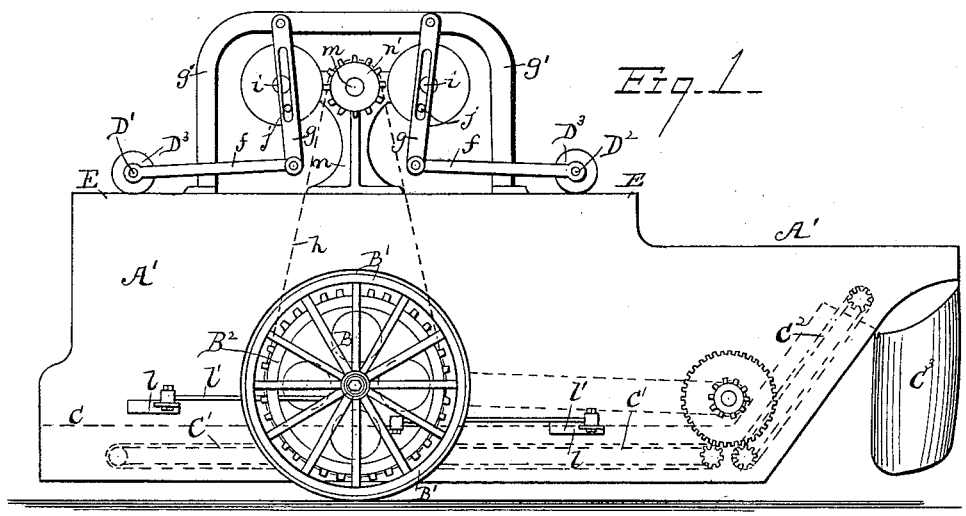
Figure 2:
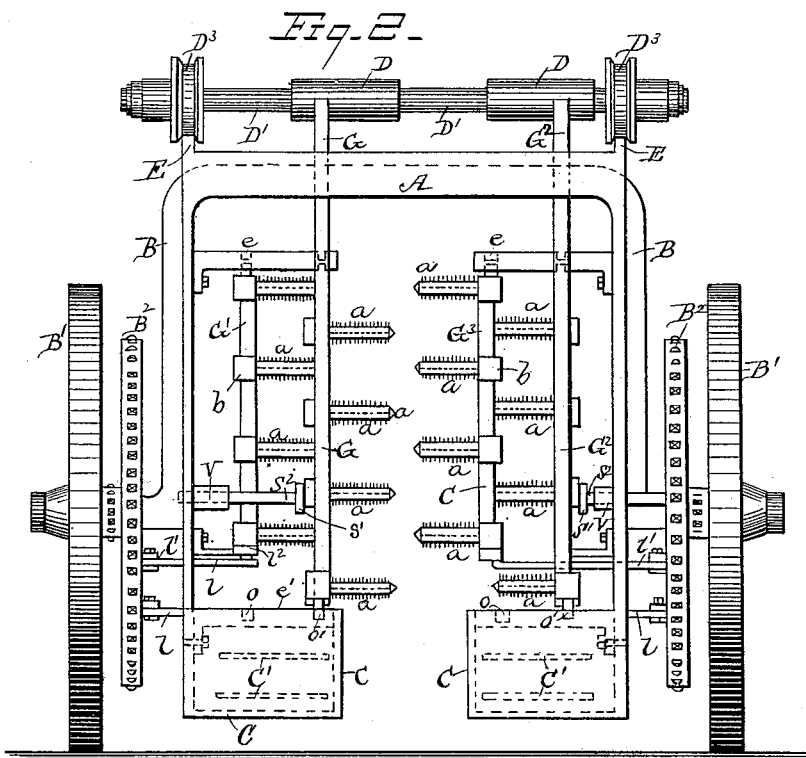
Figure 3:
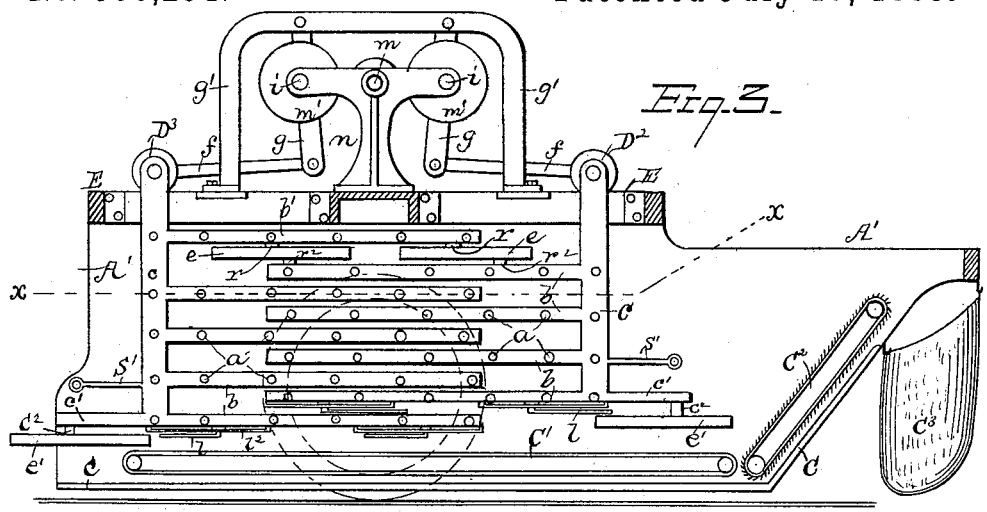
Figure 4:
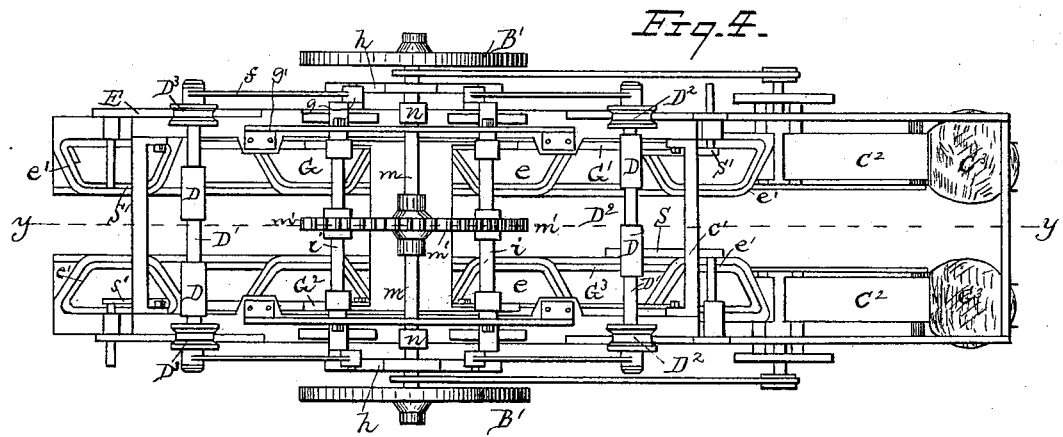

In the drawings, Figure 1 is a side elevation of the machine. Fig. 2 is an elevation of the front of the machine, the driving-wheels and their arched axle being added to the vehicle-frame to represent its means of support. Fig. 3 is a longitudinal section on line $y\ y$ in Fig. 4, the latter view being a plan or top view of the machine, and Fig. 5 being a horizontal section of the vehicle and the stem-carrying frames upon line $x\ x$ in Fig. 3. Fig. 6 is a plan of one of the grooved cams. Fig. 7 is a transverse section across the widest part of the same; Fig. 8, an end view, and Fig. 9 a rear view, of one of the stem-carrying frames, the casing or guide over the chain-driver being cut open on one of the arms to exhibit the pinions of the picker-stems and their mode of operation. Fig. 10 is a transverse section of one of the arms at the center of one of the picker-stems, the base of the picker-stem only being shown in section. Fig. 11 is a bottom view of the stem-carrying frame; Fig. 12, a front view of one end of the stem-carrying frames, showing the connections from the stationary rack to the several pinions which drive the stems upon the parallel arms. Fig. 13 is a plan of one of the parallel-motion levers for the frame, and Fig. 14 is an edge view of the same. Fig. 2 and Figs. 6 to 14, inclusive, are drawn upon a larger scale than the plans and elevations shown in Figs. 1, 3, 4, and 5.

To avoid obscuring the moving parts the sides of the machine are represented as flat plates, but would in practice be strengthened by ribs or braces.

The body of the vehicle is formed with a top, A, and sides, A', the axle B, which supports the carrying-wheels B', being arched to pass through the cotton-plants and serving to brace the top and sides of the vehicle together.

C are troughs formed at the bottom of the sides A', to contain carrier-belts C', which move longitudinally toward the rear of the machine to transfer the cotton, when picked, to elevator-belts $C^2$, to place the same in bags $C^3$.

$B^2$ are chain-wheels affixed to the carrying-wheels B' to rotate therewith to drive the cotton-picking devices, and the latter are suspended by sleeves D from transverse shafts D' and $D^2$, mounted movably upon the top of the vehicle near the front and rear ends of the same. These shafts are furnished at opposite ends with grooved wheels $D^3$, which fit upon tracks E along the edges of the top of the frame A, as more plainly shown in Fig. 2, and are reciprocated longitudinally by means hereinafter described.

$a$ are the picker-stems arranged in rows upon the horizontally-moving bars $b$, which are connected together in series of four or five bars by a post, $c$, at one end of each series. The machine illustrated contains four such picker-frames, lettered G, G', $G^2$, and $G^3$, the frames G and $G^2$ being suspended at opposite sides of the machine from the shaft D', with their arms projecting toward the rear of the machine, and the frames G' and $G^3$ being suspended from the rear shaft $D^2$, with their arms projected in the opposite direction and interposed between the arms of the other frames.

Two grooved cams, $e$, are secured to each side of the machine and project between the bars $b'$, secured to the post $c$ of the front stem-carrying frames G and $G^2$, and the upper arms, $b$, which carry the stems. Upon the under side of the said bars $b'$ are arranged pins $r$, which fit and move freely in grooves $o$ in the upper side of the cams.

One cam is shown in Fig. 6 as provided with an outer side groove, $o$, long enough to permit the entire longitudinal movement required for the stem-carrying frames when the picker-stems are withdrawn from the cotton-bush, and with an inner side groove, $o'$, connected with the opposite ends of the groove $o$ by inclined channels $o^2$ and $o^3$, the latter having a spring-switch, $p$, fixed therein to permit the movement of the guide-pins $r$ along the groove $o$ in the direction of the arrow $r'$ and to lead such pins into the inner groove, $o'$, through the channel $o^3$ when the movement of the pin is reversed.

The shafts $D'$ and $D^2$ are reciprocated in opposite directions by mechanism mounted upon the top A and actuated by a chain, $h$, applied to one or both of the wheels $B^2$.

A shaft, $m$, is mounted in standards $n$ across the top of the machine and is rotated by a sprocket-wheel, $n'$, and the chain $h$, and imparts motion by gears $m'$ to crank-shafts $i$, arranged parallel therewith and provided at their opposite ends with crank-pins $j$.

Slotted levers $g$ are fulcrumed upon a standard, $g'$, adjacent to the disks which carry the crank-pins $j$, and are connected at their free ends to the shafts $D'$ and $D^2$ by links $f$.

The movement of the crank-pins $j$ in the slotted levers $g$ produces a reciprocating movement of the levers in opposite directions, thus moving the shafts $D'$ and $D^2$ and the picker-frames attached thereto longitudinally upon the vehicle. Such reciprocating motion of the frames carries their attached guide-pins $r$ along the grooves in the cams $e$, and thus imparts a lateral motion to the stem-carrying frames, which motion is permitted by the sliding of the sleeves D upon their sustaining-shafts $D'$ and $D^2$. Guide-pins $r^2$ also project from the top bar, $b$, of the rear stem-carrying frames $G'$ and $G^3$ and fit grooves in the under sides of the cams $e$, as shown in Fig. 7, which grooves correspond in their shape and function to those shown in Fig. 6 upon the upper side of such cams.

At the lower end of each of the posts $c$ an extension, $c'$, is projected and furnished each with a guide-pin, $c^2$, and a cam, $e'$, is provided to receive each pin and to guide it in the same path as the pins $r$.

Levers $l$ are pivoted upon the sides A', adjacent to the bottom of the stem-carrying frame, each with their outer ends projected through such sides and connected together by links $l'$, so as to maintain a parallel motion of the levers, and the inner ends of the levers are provided with pins fitted to slotted plates $l^2$, secured upon the lower edge of each stem-carrying frame at its opposite ends.

The lateral movement of the stem-carrying frames, which is effected at their lower edges by the cams $e'$, thus moves the inner arms of the levers $l$ to and from the sides A', and as the levers are so constructed as to maintain their parallelism, they also effect a parallel movement of that part of the frame to which they are attached, the lever-arms swinging inward as the stem-carrying frames move laterally, and the pins upon the ends of the levers sliding in the slotted plates $l^2$, when the stem-carrying frames are moved longitudinally.

The longitudinal movement of the stem-carrying frames upon the vehicle is intended to compensate for the forward motion of the latter while the picker-stems are engaged in the cotton-plant, and the quick return motion of the stem-carrying frame, which is effected by the arrangement of the slotted levers $g$, which are operated by the crank-pins $j$ on the crank-shafts $i$ to restore the stem-carrying frames without loss of time to their initial position upon the vehicle, after the picker-stems have been inserted in the cotton-plant, and have been withdrawn, to be relieved of their load of cotton, by mechanism hereinafter described.

The guide-pins in the several cams traverse the channel $o^3$ to move the picker-stems laterally toward the cotton-plant, and the stems are held approximately in the same relation to the plant while the guide-pin straverse the groove $o'$, the movement of the pins in the channel $o^2$ finally serving to withdraw the stems from the cotton-bush into a position where the cotton can be collected from the stems.

The mechanism for rotating the picker-stems is adapted to turn them in one direction while in the cotton-plant, to gather the cotton, and to rotate them in the opposite direction. The forward rotation of the picker stems serves to gather the cotton from the plants, and the reverse rotation serves to drop the same. This rotating mechanism is shown in Figs. 8 to 12, inclusive, and consists, first, in a pinion, $s$, fixed upon each of the stem-carrying frames, and racks $s'$, held upon the sides of the vehicle and adapted to rotate the pinions $s$ in opposite directions when the stem-carrying frames are reciprocated longitudinally. Such pinions are journaled (one for each stem-carrying frame) upon the posts $c$, and by means of pinions $t$, rigid with pinions $s$, and chains $t'$, rotate chain-wheels $t^2$ at the end of each of the stem-carrying bars $b$. The chain-wheels $t^2$ are integral with and rotate similar wheels, $t^4$, upon the opposite side of the post, and each of the stems is provided with a chain-wheel, $t^3$, on the same side of the bars $b$ as, and in line with, the wheels $t^4$. An endless chain, $u$, is carried around each of the chain-wheels $t^3$ of the stems mounted in the arms or bars $b$, and also around the wheels $t^4$ on the post $c$, the chain being held in contact with each of the wheels $t^3$ by a sheet-metal casing or covering, $d$, secured to the bars $b$. A vertical chain, $t'$, upon the post $c$ imparts motion to all the pinions $t^2$ at the base of each of the bars $b$, whereby motion is transmitted to the wheels $t^4$, and from them, by the chain $u$ on the opposite side of the post $c$, to all the picker-stems upon a single stem-carrying bar, rotating them in the desired directions by the pinions $s$ traveling over the racks $s'$.

To compensate for the lateral movement of the stem-carrying frames, the racks $s'$ are connected movably to the sides A' by lateral pins $s^2$, which are fitted to move freely in sockets $v$ upon such side. The pins $s^2$ thus slide in and out of the socket during the lateral movements of the stem-carrying frame, while the racks are held stationary in a longitudinal direction, and thus the pinion *s* is rotated in the required manner.

From the above description it will be seen that our construction affords a convenient means of maintaining the parallelism of the picker-stems when entering and leaving the cotton-bush and of holding the stems at nearly the same spot in the plant while the vehicle is advancing, the stems being thus inserted into and removed from the cotton-plant without any injury to the latter.

The reversal of the stems' rotations by the use of the fixed rack *s'* and the construction of the cams *e e'* also automatically effects the reversal just when the stems are wholly withdrawn from the bush, and when the longitudinal return motion of the stem-carrying frames is parallel with the receiving-belt C'.

It will be seen that in our construction the space occupied in the rear of the picker-stems by the mechanism at each side of the cotton-plant is but little more than the thickness of the stem-carrying frames and the side A' of the vehicle, and that the machine is thus rendered more compact than when the stems are mounted upon any kind of rotating device which projects the picker-stems at one time toward the cotton-bush, and then away from the same to discharge the gathered cotton.

The use of the grooved cams and the switches therein to effect the necessary lateral motion also simplifies the driving mechanism for the frame, and permits the use of any convenient means to move the stem-carrying frames longitudinally.

The levers *l* are used for maintaining the parallelism of the stem-carrying frames at the bottom, as they interfere less than cams would do with the dropping of the cotton from the stems to the carrier C'.

It is immaterial what means are used to transport the cotton from the stems when discharged therefrom by their reverse rotation, or what means be used to rotate the stems upon the bars *b*, as the essential part of our invention is the combined lateral and longitudinal movement of a bar sustaining a series of picker-stems at the side of the cotton-plant. It will be noticed, however, that at the time the bar is retracted from the cotton-plant the engagement of a whole series of rotating stems with the lint or fibers of the plant tends to draw the branches of the bush toward the sides A' and to prevent the disengagement of the stems therefrom.

As shown in Fig. 3, the bars *b* upon the frame G are interposed between the bars upon the frame G', so as to pass bodily in and out between each other when moved to and from the plants, and each set of bars thus serves alternately as fenders to the stems upon the other set, and pushes the cotton-branches wholly from them before the stems are reversed to discharge the cotton.

Figure 5:
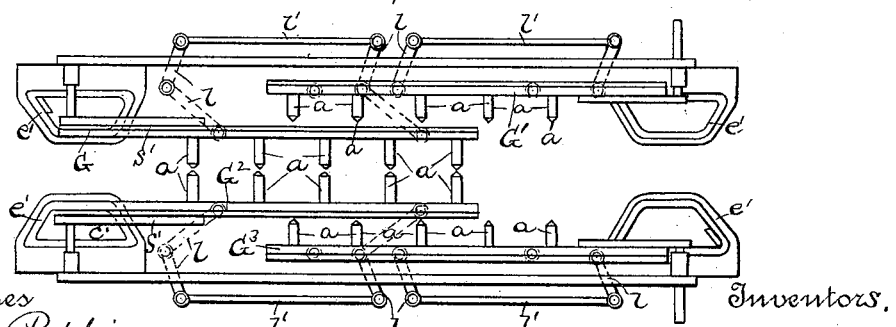

The stem-carrying frames which operate upon opposite sides of the cotton-bushes may be pressed toward the same simultaneously, as shown in Fig. 5, to prevent the bush from retiring from the stems, or they may be advanced toward the bush alternately, if preferred.

We claim—

1. In a cotton-harvester, the combination, with a vehicle arched to pass over the cotton-plants, of a stem-carrying bar sustained movably upon the vehicle at each side of the plants, a series of picker-stems journaled upon such bar, the cams and guide-pins whereby the bar is moved laterally to and from the cotton-plant, and the slotted levers and crank-shafts whereby the bars are moved longitudinally backward upon the vehicle while the stems are in the plants, and moving said bars forward at an accelerated rate of speed when the stems are removed from the plants, substantially as specified.

2. In a cotton-harvester, the combination, with a vehicle arched to pass over the cotton-plants, of a stem-carrying bar sustained movably upon the vehicle at each side of the plants, a series of picker-stems journaled upon such bar, the gearing for rotating the stems in one direction to gather the cotton and in the opposite direction to discharge the same, the cams for moving the bar laterally to and from the cotton-plant, and the slotted levers, crank-pins, and crank-shafts, whereby the bars are moved longitudinally at a differential speed, substantially as specified.

3. In a cotton-harvester, the combination, with the vehicle, of the shafts D D', arranged transversely upon the top of the same, frames suspended from the shafts and movable laterally thereon, picker-stems journaled upon said frames, means actuated by the wheels of the vehicle to reciprocate the shafts and frames lengthwise of the vehicle, and fixed cams and means connecting them with the frames, whereby they are adapted to move the frames laterally when thus reciprocated, substantially as set forth.

4. In a cotton-harvester, the combination, with the reciprocating frame carrying a series of picker-stems, of the cam provided with the outer and inner grooves, and inclined channels at each end, a switch at the end of the rear channel, and a pin upon the frame fitted to such cam, substantially as set forth.

5. In a cotton-harvester, the combination, with a stem-carrying bar having a series of picker-stems journaled therein, of sprocket-wheels upon the arbors of such stems, an endless chain in contact with the sprocket-wheels, and a guard carrying the chains adjacent to the wheels to retain the chain thereon, substantially as specified.

In testimony whereof we have hereunto set our hands in the presence of two subscribing witnesses.

OWEN T. BUGG.
WILLIAM L. LANGLEY.

Witnesses:
THOS. S. CRANE,
HENRY J. MILLER.